United States Patent [19]
Umemura et al.
[11] Patent Number: 4,845,193
[45] Date of Patent: Jul. 4, 1989

[54] PROCESS FOR PRODUCING POLYCARBONATE RESIN MOLDING MATERIAL HAVING LOW PARTICLE CONTENT WITH VENTED EXTRUDER

[75] Inventors: Toshikazu Umemura; Kenji Maeda; Yutaka Kojima; Toshiaki Izumida; Kou Tanabe, all of Osaka, Japan

[73] Assignee: Mitsubishi Gas Chemical Co., Inc., Japan

[21] Appl. No.: 222,483

[22] Filed: Jul. 21, 1988

[30] Foreign Application Priority Data

Jul. 21, 1987 [JP] Japan ..... 62-180042
Jul. 29, 1987 [JP] Japan ..... 62-187707
Dec. 7, 1987 [JP] Japan ..... 62-307465

[51] Int. Cl.[4] ..... C08G 63/62
[52] U.S. Cl. ..... 528/502; 528/196; 528/481; 528/487; 528/499
[58] Field of Search ..... 528/502, 196, 481, 499, 528/487

[56] References Cited

U.S. PATENT DOCUMENTS 3,954,713 5/1976 Schnoring et al. ..... 528/502
4,252,968 2/1981 Govoni et al. ..... 528/502
4,546,172 10/1985 Kohyama et al. ..... 528/502

*Primary Examiner*—Harold D. Anderson
*Attorney, Agent, or Firm*—Sughrue, Mion, Zinn, Macpeak & Seas

[57] ABSTRACT

A process for producing a low-particle polycarbonate resin molding material suitable for use as molding material for optical materials is disclosed, which comprises directly supplying a polycarbonate resin wet powder having a water content of from 0.5 to 10.0% by weight and an organic solvent content of from 0.01 to 5.0% by weight, said wet powder, when dried, having a weight average particle diameter of from 5 to 60 mesh, to a vented extruder and extruding the wet powder while venting to obtain pellets containing not more than 20 ppm of a residual halogenated hydrocarbon. The molding material has a greatly decreased solvent content while being freed from a particle content increase.

6 Claims, No Drawings

PROCESS FOR PRODUCING POLYCARBONATE RESIN MOLDING MATERIAL HAVING LOW PARTICLE CONTENT WITH VENTED EXTRUDER

FIELD OF THE INVENTION

This invention relates to a process for producing a polycarbonate resin molding material having a reduced particle content. More particularly, it relates to a simplified process for producing a low-particle polycarbonate resin molding material suitable for use as an optical material.

BACKGROUND OF THE INVENTION

Polycarbonate resins for use as optical material is preferably free from particles as well as from impurities, e.g., halogen components, which may be incorporated during production.

In the conventional processes for producing an aromatic polycarbonate resin molding material from a polymerization mixture obtained by interfacial polymerization of a bisphenol and phosgene in the presence of a halogenated hydrocarbon as a good solvent, a resin solution is separated from the polymerization mixture and, after purification, the resin is recovered from the solution, dried, and pelletized by extrusion; or the resin solution is property concentrated and then extruded while removing the solvent by distillation to obtain pellets.

Methods for separating the resin from the purified resin solution include (a) a concentration method which comprises concentrating a solution of the resin in a good solvent which may contain a poor solvent in such a proportion that does not cause precipitation to thereby gelatinize the resin (called "gelation by concentration method", "gelation by solvent distillation method", "gelation by flash concentration method", etc.) or which comprises dropwise adding the above-described resin solution to warm water to distill the solvent to thereby gelatinize the resin (called "dropping in warm water method") and (b) a precipitation method which comprises dropwise adding the above-described resin solution into a poor solvent or vice versa.

However, these conventional separation methods involve disadvantages such that the solvent remaining in the resulting resin gel is difficult to remove by drying depending on the kind of the resin gel and the permissible residual amount of the solvent and that a large-sized drying apparatus is required. Further, since the drying and extrusion steps necessarily handle a solid powder having been dried to a high degree, it is unavoidable that the polycarbonate resin undergoes denaturation such as gelation or carbonization or causes wear of equipments due to mechanical abrasion. As a result, it has been difficult to inhibit an increase of particle content. In more detail, the increase of particle content has hitherto been coped with by adopting methods or conditions for obtaining a wet powder which may reduce the load of drying (for example, a combination of the dropping-in-warm-water technique and slurry grinding) and controlling the shape or structure of the resulting wet powder to obtain a spherical and porous resin powder which can be dried with comparative ease and is less causative of mechanical wear, or by strictly selecting an apparatus for extrusion or minutely controlling drying or extrusion conditions. Nevertheless, it has been still difficult to completely inhibit the increase of the particle content during the drying or extrusion step.

Although direct extrusion of a concentrated polycarbonate resin solution to obtain pellets is advantageous from the standpoint of inhibition of the particle content increase, it is difficult to reduce methylene chloride, a solvent for the polycarbonate resin, to such an extent causing no substantial problem.

On the other hand, methods for purifying the aromatic polycarbonate resin solution include a method comprising repeatedly washing the resin solution with pure water in a batch system and separating the resin solution layer from the aqueous layer by allowing the system to stand or by centrifuging at the point when the aqueous layer becomes neutral, a method comprising contacting the polycarbonate resin solution with activated carbon to remove monomers and oligomers as disclosed in JP-B-41-8475 (the term "JP-B" as used herein means an "examined published Japanese patent application"), a method comprising passing a mixed solution of the polycarbonate resin solution and water through a hydrophilic filter layer having a water contact angle of 40° or less (e.g., cotton cloth, filter paper, diatomaceous earth, and glass cloth) to separate into an aqueous phase and a resin solution phase from which water-soluble impurities have been removed as disclosed in JP-B-46-41622.

Since mere washing with pure water is not sufficient for completely remove free chlorine, it is necessary to decrease the water content in the resin solution. However, reduction of the water content in the resin solution by centrifugal separation to 0.2% by weight or less essentially requires an extraordinarily large force and time for centrifuging and, thus, the apparatus therefor should be large-sized, making it difficult to utilize this technique on an industrial scale. The method utilizing a filter layer finds difficulty in reducing the water content of the resin solution to 1% by weight or less. Therefore, the resin solution obtained by these conventional methods necessarily contains about 0.5 ppm of free chlorine. As a result, it has been difficult to prevent damages of a metal layer for recording film due to spot or overall corrosion under high temperature and high humidity conditions.

In order to solve this problem, it has been proposed to take up free chlorine and convert it to a stable and harmless substance instead of removal of free chlorine. This concept has been embodied typically by incorporating a known stabilizer for polycarbonate. However, none o the state-of-the-art stabilizers is satisfactory.

SUMMARY OF THE INVENTION

In the study of photo discs made of polycarbonate, the inventor have experimentally prepared photo disc bases made of a conventional polycarbonate resin having deposited thereon a metal layer for recording and examined damages of the recording film due to high temperature and high humidity. As a result, they confirmed existence of free chlorine on the bases in the vicinity of sites where the recording film in contact underwent destruction due to spot-like or overall corrosion. In some cases, sodium was also detected in addition to chlorine in these sites of corrosion. Hence, it was assumed that free chlorine in the polycarbonate base exists in the form of sodium chloride or hydrogen chloride.

Based on this assumption, it was believed that removal of sodium chloride or hydrogen chloride from a polycarbonate resin to be used as a molding material for optical materials, particularly photo discs, must be one of the very important subjects. It was also confirmed that a solvent content in the polycarbonate resin is preferably reduced to 20 ppm or less, more preferably 10 ppm or less, because a residual solvent, especially a halogenated hydrocarbon, in the polycarbonate resin acts as a source of a free halogen on heating during injection molding or on standing under high temperature and high humidity conditions to cause deterioration of adhesion of the recording film or corrosion of the recording film.

Accordingly, one object of this invention is to provide a process for producing a polycarbonate resin molding material, the process excluding steps handling a dried solid powder to thereby solve the problem of the particle content increase during drying and extrusion steps.

Another object of this invention is to provide a process for producing polycarbonate resin molding material having a reduced content of a residual solvent.

A further object of this invention is to provide a process for producing a polycarbonate resin molding material which contains virtually no free chlorine and, therefore, assures long-term reliability of a recording film.

As a result of extensive investigations, it has now been found that the above objects can, be accomplished by a process in which a polycarbonate wet powder having a specific water content, a specific organic solvent content, and a specific particle size distribution is directly supplied to a vented extruder and pelletized while removing the residual solvent and water by distillation.

It has also been found that the water content in a polycarbonate resin solution can be greatly reduced on an industrially practical scale by combining centrifugal separation and filtration to thereby accomplish removal of free chlorine.

The present invention relates to a process for producing a low-particle polycarbonate resin molding material, which comprises separating an aromatic polycarbonate resin solution from a reaction mixture obtained by interfacial polymerization of a bisphenol and phosgene in the presence of a halogenated hydrocarbon as a solvent, purifying the resin solution so as to have a reduced particle content, separating a polycarbonate resin from the purified polycarbonate solution to obtain a polycarbonate resin wet powder having a water content of from 0.5 to 10.0% by weight and an organic solvent content of from 0.01 to 5.0% by weight, said wet powder, when dried, having a weight average particle diameter of from 5 to 60 mesh, supplying said wet powder directly to a vented extruder, and extruding the wet powder while venting to obtain pellets containing not more than 20 ppm, preferably not more than 10 ppm, of a residual halogenated hydrocarbon.

In one preferred embodiment of this invention, the vent of the vented extruder to be used has a theoretical surface renewal frequency (Rf) of at least 150, the Rf being defined by equation (1):

$$Rf = A/V \quad (1)$$

wherein A represents a surface renewal of the vent ($cm^3$/sec); and V represents a resin hold-up ($cm^3$) at the vent portion.

In another preferred embodiment of this invention, the organic solvent in the wet powder comprises methylene chloride that is a good solvent for a polycarbonate resin and a poor solvent for a polycarbonate resin selected from the group consisting of n-heptane, n-hexane, cyclohexane, benzene, toluene, and xylene at a good solvent/poor solvent weight ratio of not more than 0.2.

In a still another preferred embodiment of this invention, the wet powder is separated from the purified polycarbonate resin solution by adding a non-solvent or poor solvent for the polycarbonate resin in such an amount that does not cause precipitation, dropwise adding or spraying the resulting uniform solution into water kept at 40° to 140° C. under stirring to gelatinize, and removing the solvent by distillation to obtain a porous powder, followed by dehydration.

In a further preferred embodiment of this invention, the polycarbonate resin solution separated from the polymerization mixture by removing an alkali aqueous solution is purified by neutralization treatment comprising at least three stages of washing with water, washing with a phosphoric acid aqueous solution, and washing with water, the phase separation after each of the washing stages being performed by a centrifugal force of 500 G or more, to finally obtain a resin solution having a water content of not more than 0.5% by weight, with the washings having an electrical conductivity of not more than 10 μs/cm, passing the resulting resin solution through a hydrophobic porous filter having a pore diameter of from 0.2 to 10 μm while removing water droplets condensed on the surface of the filter to obtain a resin solution having its water content reduced to 0.2% or less.

DETAILED DESCRIPTION OF THE INVENTION

The polycarbonate resin wet powder which can be used in the present invention contains from 0.5 to 10.0% by weight of water and from 0.01 to 5.0% by weight of an organic solvent Further, the wet powder, when dried, has a weight average particle size of from 5 to 60 mesh, preferably such a particle size range that the proportion of those particles having a particle size of 80 mesh or less and those particles having a particle size of 10 mesh or more do not exceed 5% by weight.

It is preferable that the organic solvent contained in the wet powder comprises methylene chloride (good solvent) and a poor solvent selected from the group consisting of n-heptane, n-hexane, cyclohexane, benzene, toluene, and xylene at a good solvent/poor solvent weight ratio of not more than 0.2.

If the water content of the wet powder is less than 0.5% by weight, removal of volatile components, such as organic solvents, for hardening would be insufficient. If it exceeds 10.0% by weight, the bite into an extruder screw would be deteriorated.

The smaller the organic solvent content, the better. To make the organic solvent content less than 0.01% by weight is not impossible but is unnecessary in view of practice because such a low content can be sufficiently removed during the subsequent extrusion step. If the organic solvent content exceeds 5% by weight, the extruder to be used should have an extraordinarily large size in order to reach the desired residual solvent content, resulting in economical disadvantage.

The above-recited weight ratio of good solvent to poor solvent (or non-solvent) in the wet powder is preferred for ensuring complete removal of the good solvent, e.g., methylene chloride.

If the dry weight average particle size of the wet powder is smaller than 60 mesh, the wet powder is liable to adsorb fine particles and difficult to handle. If it is larger than 5 mesh, the bite of the wet powder into the extruder screw becomes unstable.

The polycarbonate resin wet powder as above specified is preferably obtained by the so-called dropping-in-warm-water method, in which a non-solvent or poor solvent for the polycarbonate resin is added to a purified solution of the polycarbonate in a good solvent therefor in such an amount that does not cause precipitation, the resulting solution is added dropwise to warm water, and the solvent is then removed therefrom by distillation while appropriately pulverizing in a wet state. In addition, the wet powder may also be prepared by warm water treatment of a precipitate, in which a powder containing a good solvent and a non-solvent or poor solvent which is obtainable by a usual precipitation method is treated in warm water, followed by appropriately pulverizing in a wet state while removing the solvent by distillation.

The polycarbonate resin to be used may be any of aromatic homo- or copolycarbonate resins prepared from general bisphenols inclusive of branched polymers thereof and those having incorporated therein a long-chain alkyl group at their terminal, each of which has a viscosity average molecular weight of from 13,000 to 30,000; graft polymers obtained by grafting styrene, etc. to a polycarbonate resin having grafting points derived from a chain terminator or a comonomer having a carbon-carbon unsaturated double bond, etc.; graft polymers obtained by grafting a polycarbonate resin to a copolymer of styrene, etc. and a compound providing grafting points for polycarbonate, e.g., a compound having a phenolic hydroxyl group; and the like.

Good solvents which can be used for polymerization include halogenated hydrocarbons, e.g., dichloromethane (i.e., methylene chloride). 1,1-dichloroethane, chlorobenzene, chlorotoluene, etc., with methylene chloride being particularly preferred.

The non-solvent or poor solvent which can be used includes n-heptane, n-hexane, cyclohexane, benzene, toluene, and xylene, with n-heptane, n-hexane, and cyclohexane being preferred.

The resin solution separated from the polymerization mixture is generally purified by removal of the catalyst, neutralization, washing with water, concentration, and the like technique, followed by removal of fine particles by centrifugation, precision filtration, etc. The fine "particles" in the purified polycarbonate resin solution is preferably eliminated to the least possible degree. For example, it is preferable that the number of "particles" having a diameter of 0.5 μm or greater should be reduced to 1000 or less per $cm^3$ of the polycarbonate resin solution. The resin concentration in the solution ranges from 10 to 25%, preferably from 10 to 20%, by weight.

In a preferred embodiment, the purification of the polycarbonate resin solution is carried out by a combination of centrifugation and filtration through a finely porous filter. According to this embodiment, after an alkali aqueous solution is separated from the mixture resulted from polymerization, the remaining solution is subjected to neutralization treatment comprising at least three stages of washing, i.e., washing with water, washing with a phosphoric acid aqueous solution, and washing with water in this order. The layer separation after each stage is effected by means of a centrifugal force of at least 500 G. The washing in the final stage should be performed until the aqueous layer separated by centrifugation (washings) has an electrical conductivity of not more than 10 μs/cm, preferably not more than 9 μc/cm, while the resulting resin solution has a water content of not more than 0.5% by weight. Then, the resin solution is passed through a filter having a fine pore of 0.2 to 10 μm in diameter whereby a part of water in the solution is condensed on the surface of the filter and separated as water droplets of 1 mm or more in diameter, which are then removed to thereby recover a resin solution having a water content of not more than 0.2%, preferably not more than 0.15%, by weight.

The washing water to be used in the final washing stage is ion exchanged water substantially free from free chlorine, preferably having a Cl ion of no more than 0.1 ppm that is the lower limit of quantitative determination by the state-of-the-art colorimetric or potentiometric analysis. Such pure water can easily be obtained by treatment with a mixed phase of a strongly basic ion exchange resin and a strongly acidic ion exchange resin in equal amounts. The pure water is used in an amount of from 0.05 to 2.0 times the volume of the resin solution, preferably in such an amount that water may be emulsified and dispersed in the resin solution.

The centrifugal separation is conducted with a centrifugal force of at least 500 G, preferably at least 3000 G. If the centrifugal force is too small, the water content of the resulting resin solution becomes too high, still requiring repetition of washing followed by centrifugal separation many times or creating a difficulty in reducing conductivity of the separated aqueous layer to 10 μ/cm or less even by repeatedly washing with water, to the ultimate failure to reduce the free chlorine content in the polycarbonate resin to 0.2 ppm or less.

With respect to the filter, the finer the pore, the higher the separation efficiency, which is favorable from the standpoint of separation of a water content. However, in view of pressure loss, etc., the pore size preferably ranges from 0.2 to 10 μm. Suitable materials of the filter include fluorine-containing resins, e.g., polyperfluoroethylene, poly-perfluoroethylene-perfluoropropylene, polyvinylidene fluoride, etc., and hydrophobic resins, e.g., polyester resins, polypropylene, etc. Relatively hydrophilic materials, e.g., polyamide, cellulose, stainless steel, etc., may also be employed. Use of glass fibers, activated carbon, diatomaceous earth or the like material is unfavorable in the present invention because they cause incorporation of fine particles. The structure of the filter includes fibers, open-cell films, and sinter-molding products of powders. The filtration may be effected using either a single filter or multiple filters depending on the filter material or a desired water content.

In the case of preparing the wet powder by the dropping-in-warm-water method, the amount of the non-solvent or poor solvent to be added is properly selected depending on the difference in solubility parameter (SP) between the polycarbonate resin and the non-solvent (or poor solvent) and the concentration of the polycarbonate resin solution. For example, when the polycarbonate resin solution has a concentration of from 15 to 25% by weight, n-heptane showing an SP difference of about 2.3 is used in an amount of from 0.15 to 0.5 times the volume of the resin solution; cyclohexane showing an SP difference of about 1.55 in an amount of from 0.3 to 0.6 times; and toluene showing an SP difference of about 0.9 in an amount of from 0.5 to 0.8 times. The thus obtained uniform solution is dropped or sprayed into water kept at a relatively low temperature of 40° to 60° C. under stirring to set to gel. The mixture is then maintained at a high temperature of 80° to 140° C. to distill away the solvent to obtain an aqueous slurry of a porous powder of the polycarbonate resin. During the preparation of the aqueous slurry, it is preferable that the gelled particles are appropriately pulverized by means of a stirring blade or a wet grinder, which facilitates removal of the solvent by distillation in the extruder. The aromatic polycarbonate powder is then separated from the aqueous slurry and dehydrated. In a usual case where methylene chloride is used an a good solvent and n-heptane as a non-solvent or poor solvent, the resulting powder contains from 0.001 to 0.3% by weight of methylene chloride and from about 0.01 to 2% by weight of n-heptane in addition to water.

In the case where the wet powder is prepared by the warm water treatment of a precipitate, the purified solution of the polycarbonate resin in a good solvent is added dropwise to a non-solvent or poor solvent, or a nonsolvent or poor solvent is added dropwise to the purified resin solution, to thereby form a precipitate, which is then recovered to obtain a powder. To the powder is then added water in an amount of at least 5 times the weight of the resinous content in the powder to form a slurry. The resulting aqueous slurry is introduced into warm water, followed by boiling to further reduce the solvent content and also to adjust the particle size of the powder within the above-specified range. The resin powder is then separated from the aqueous layer and dehydrated to obtain the desired wet powder. In this case, too, the resulting wet powder has the similar good solvent and non-solvent (or poor solvent) convents as described above. Prior to the treatment in warm water for solvent removal and particle size control, the wet powder may be appropriately subjected to pretreatment, such as washing with a non-solvent or poor solvent for the polycarbonate resin, heating, and the like.

According to the present invention, the thus obtained wet powder of the polycarbonate resin is directly supplied to a vented extruder. Additives, such as a stabilizer, a release agent, and the like may appropriately compounded into the wet powder. The powder is extruded at a resin temperature of from 280° to 340° C., preferably from 300° to 320° C., while venting by diminishing the pressure at the vent portion, preferably to 10 Torr or less, to thereby obtain pellets containing not more than 20 ppm of the residual halogenated hydrocarbon. In the case of using liquid additives as described above, these additives may be introduced under pressure into the molten resin area of the extruder by the use of pumps and mixed therewith.

In the present invention, the organic solvent is removed simultaneously with pelletization by extrusion. Therefore, it is desirable from the standpoint of productivity that the solvent is satisfactorily distilled off from the vent portion. To this effect, the vent portion has reduced pressure and, in addition, it is preferable to use in practice a vented extruder whose vent portion has a theoretical surface renewal frequency (Rf) of at least 150, the Rf being defined by equation (1):

$$Rf = A/V \quad (1)$$

wherein A represents an amount of a surface renewal of the vent portion ($cm^2/sec$); and V represents a hold-up of the resin at the vent portion ($cm^3$).

In equation (1), the amount of the surface renewal (A) can be calculated according to equation (2):

$$A = (\pi D \times N \times Lv \times Ns)/60 \quad (2)$$

wherein D represents a screw diameter (cm) at the bent portion of the extruder; N represents a number of revolutions (rpm) of the screw; Lv represents a length (cm) of the vent portion; and Ns represents the number of the screw.

The hold-up (V) of the resin at the vent portion can be calculated from equation (3):

$$V = (V_1 \times t \times Lv)/L \quad (3)$$

wherein $V_1$ represents a resin output of the extruder ($cm^3/sec$); t represents a retention time in the extruder (sec); and Lv is as defined above.

In order to prevent the polycarbonate resin from gelation or carbonization during extrusion, the barrel, screws, etc. of the extruder are preferably made of materials that are less causative of gelation or carbonization, such as those having an overall hard chrome plating. SKD steel or nitrided SKD steel is not favorable.

Thus, a molding material of the present invention having been purified so as to contain not more than 20 ppm, preferably not more than 10 ppm, of a halogenated hydrocarbon (e.g., methylene chloride) and not more than 0.2 ppm of free chlorine can be obtained. In cases where the molding material is molded at high temperatures exceeding 350° C., at which decomposition or gelation of the resin may occur, it is effective to add a thermal stabilizer to the molding material as described above.

The thermal stabilizer to be used includes organic phosphite compounds, organic phosphonite compounds, phosphoric acid, phosphorous acid, hindered phenol antioxidants, and the like. In particular, a stabilizer system comprising 0.0005 to 0.01 part by weight of phosphorous acid and from 0.001 to 0.2 part by weight of a hindered phenol antioxidant each per 100 parts by weight of a polycarbonate resin is effective for improvement of heat resistance during molding and long-term hydrolysis resistance.

According to the end use of the polycarbonate resins for optical materials, it is favorable to use a parting agent, such as fatty acid esters, long-chain fatty acids, paraffin, silicone oil, etc., in an amount of from 0.01 to 0.5 part, particularly from 0.02 to 0.2 part, by weight per 100 parts by weight of the polycarbonate resin.

The present invention is now illustrated in greater detail with reference to the following Examples and Comparative Examples, but it should be understood that the present invention is not deemed to be limited thereto. In these examples, all the percents and parts are by weight unless otherwise specified.

EXAMPLE 1

Preparation of Aromatic Polycarbonate Resin

In a 5 $m^3$-volume reactor were charged 300 kg of bisphenol A, 400 l of a 10% sodium hydroxide aqueous solution, 900 l of methylene chloride, and 0.5 kg of hydrosulfite, and the mixture was stirred. Into the mixture was poured 12.3 kg of p-t-butylphenol, and 147 kg of phosgene was blown thereinto over a period of about 45 minutes. After completion of the blowing, 0.2 kg of triethylamine was added thereto, followed by vigorously stirring for 60 minutes while maintaining at 30° C. to effect polymerization.

Purification of Resin Solution (1) Washing and Centrifugal Separation

After completion of the polymerization reaction, the reaction mixture was transferred to a continuous type centrifugal separator, and the aqueous layer was separated by a centrifugal force of 5,000 G. The thus obtained resin solution was forwarded to a stirring machine, 300 l of pure water was added thereto, followed by stirring for 30 minutes. After the stirring, the aqueous layer was separated by centrifuging in the same manner as described above. The resin solution was then forwarded to a neutralizing vessel, and 300 l of a 1% phosphoric acid aqueous solution was added thereto, followed by stirring. The phosphoric acid aqueous solution layer was separated by centrifuging in the same manner as above.

The thus separated resin solution was forwarded to a final washing tank and, after 300 % of pure water was added, stirred and then centrifuged.

The thus separated aqueous layer had a conductivity of 8.6 μs/cm, and the resin solution had a water content of 0.35%.

(2) Filtration

The resulting resin solution was filtered through a polyperfluoroethylene membrane filter having pore sizes of 1.2 μm and 0.6 μm. On the filter surface, water was condensed and collected to form large water drops at the upper part of the filter housing, which were occasionally removed. The resin solution after the filtration had a water content of 0.12%.

Preparation of Wet Powder

The resin solution thus purified was subjected to flash concentration to obtain a solution having a resin concentration of 20% and a viscosity average molecular weight of $1.5\times10^4$. To 200 l of the resulting resin solution was added 40 l of n-heptane having been similarly subjected to precision filtration, followed by stirring to form a uniform mixture. The mixture was added dropwise to warm water while being vigorously stirred in a wet grinder over a period of 10 minutes. During the dropwise addition, the liquid temperature in the grinder was kept at 40° C., and the inner pressure of the grinder was kept at 0.1 kg/cm$^2$G or less.

After the dropwise addition, the liquid temperature was raised to 95° C. or higher to remove the remaining solvent by evaporation for about 15 minutes. The resulting aqueous slurry of the polycarbonate resin was taken out and filtered for dehydration to obtain a wet powder (Run No. 1).

When the thus obtained wet powder was dried, the dried powder contained 3.7% of particles of 80 mesh or smaller and 4.0% of particles of 10 mesh or greater. The water content, n-heptane content, and methylene chloride content in the wet powder were determined according to the methods described below, and the results obtained are shown in Table 1.

Further, a wet powder of the polycarbonate resin was prepared in the same manner as described above, except for changing the heating time for solvent removal after the dropwise addition to 30 minutes (Run No. 2).

Production of Molding Material

Each of the above-prepared wet powders was supplied to a vented twin-screw extruder [screw diameter (D)=65 mm; total L/D ratio=30; vent portion L/D ratio=4) in a closed system which allowed no incorporation of fine particles and extruded while removing the solvent by distillation to obtain pellets. The extruder used had an inlet for introducing a liquid at the position of L/D=5 from the inlet for supplying the wet powder toward the outlet of the resin. The extrusion was carried out at a maximum resin temperature of 300° C. and a vent pressure of 9 Torr. Other extrusion conditions are shown in Table 1. At the time of extrusion, 0.001 part of a 1.0% phosphorous acid aqueous solution and a molten mixture consisting of 0.01 part of stearic acid monoglyceride and 0.03 part of pentaerythritol tetrastearate, each per 100 parts of the resin, were separately poured into the extruder through the inlet for introducing a liquid by means of a respective quantitative pump.

Production of Photo Discs

The pellets were injection molded to obtain a base of a photo disc for data filing having spiral grooves on its one side (diameter=130 mm; thickness=1.2 mm).

A Te-Fe-Co recording film was formed on the grooved base by vacuum evaporation to a thickness of from 300 to 500 Å, and the recording film was coated with a photo-curable acrylic resin. The coating was cured by ultraviolet rays to obtain a photo disc.

Evaluation (1) Number of Flaws of Photo Disc

The number of flaws of 30 μm or greater along the circumferential direction on the entire disc surface was counted by the use of an automatic flaw detector ("Model I" manufactured by Nippon Denshi Kogaku Co., Ltd.). The measurements were made on 20 discs, and the results were averaged.

(2) Free Chlorine Content

A 5 g portion of a sample was precisely weighed out and dissolved in 150 ml of methylene chloride. To the solution was added 50 ml of acetone. The free chlorine content was determined by potentiometric titration using a 0.0005M solution of silver nitrate in acetone as a titrant.

(3) Methylene Chloride Content

A 5 g portion of a sample was precisely weighed out and dissolved in 100 ml of dioxane. A 1 μl portion of the solution was injected into a gas chromatographic column and detected with an ECD detector. The lower limit of methylene chloride detectable with ECD is 0.5 ppm, and the precision of determination is ±0.5 ppm (2α).

(4) Water Content

A sample weighing 10 g was dried at 140° C. for 20 hours. The water content of the sample was obtained from the weight change between before and after the drying. The detection limit is 0.1% taking the precision into consideration.

(5) Number of Particles

One gram of a sample was dissolved in methylene chloride having been purified by precision filtration to make 100 ml. The number of particles measuring from 0.5 to 25 μm in diameter in a 10 ml portion of the sample solution was counted by means of a liquid particle counter ("4100 Model"; laser light-scattering type). The measurement was made on three 10 ml portions per sample, and the results were averaged. The number of the particles per 10 ml of the solution was converted to that per gram of the polymer.

All the particle countings were done in a clean room of Class 1000 or of a higher criterion, and all the containers used were made of polytetrafluoroethylene.

The results of these evaluations are shown in Table 1 below.

TABLE 1

| | Run No. 1 | | Run No. 2 | |
|---|---|---|---|---|
| | Powder | Pellet | Powder | Pellet |
| Extrusion Condition: | | | | |
| Screw Revolution (rpm) | — | 200 | — | 200 |
| Output (kg/hr) | — | 100 | — | 100 |
| Rf | — | 153 | — | 153 |
| Residual Impurities: | | | | |
| n-Heptane [(%), ppm] | 2(%) | 30 | 1(%) | 30 |
| Free Chloride (ppm) | 0.15 | 0.20 | 0.15 | 0.15 |
| Methylene Chloride (ppm) | 350 | 15 | 150 | 2 |
| Water (%) | 5.5 | <0.1 | 5.5 | <0.1 |
| Number of Particles (/g): | | | | |
| 0.5 to 1 μm | 5600 | 5900 | 5650 | 5930 |
| 1 to 10 μm | 250 | 270 | 260 | 265 |
| 10 to 100 μm | 2 | 3 | 2 | 2 |
| Number of Flaws of Photo Disc | — | 40 | — | 10 |

Example 2

A polycarbonate wet powder was prepared in the same manner as in Example 1, except the n-heptane was not added to the purified resin solution and that the time of the heat-treatment for solvent removal after the dropwise addition was changed to 2 hours.

The resulting wet powder, when dried, contained particles of 80 mesh or smaller in a proportion of 1.5% and particles of 10 mesh or greater in a proportion of 4.6%. The wet powder had a water content of 4.8% and a methylene chloride content of 180 ppm.

The polycarbonate wet powder thus obtained was pelletized in the same manner as in Example 1, except for changing the output to 100 kg/hr, 80 kg/hr, or 50 kg/hr (Run Nos. 3 to 5). The results of evaluations are shown in Table 2.

COMPARATIVE EXAMPLE 1

The same polycarbonate wet powder as obtained in Example 2 was dried in a batch system drier at 140° C. for 4 hours or 6 hours. The dried powder was pelletized in the same manner as in Example 2 (Run Nos. 6 to 8). The results of evaluations are shown in Table 2.

TABLE 2

| | Example 2 | | | Compar. Example 1 | | |
|---|---|---|---|---|---|---|
| Run No. | 3 | 4 | 5 | 6 | 7 | 8 |
| Drying Conditions: | | | | | | |
| Temperature (°C.) | — | — | — | 140 | 140 | 140 |
| Time (hr) | — | — | — | 4 | 4 | 6 |
| Extrusion Condition: | | | | | | |
| Screw Revolution (rpm) | 200 | 200 | 200 | 200 | 50 | 200 |
| Output (kg/hr) | 100 | 80 | 50 | 100 | 50 | 100 |
| Rf | 153 | 191 | 306 | 153 | 77 | 153 |
| Residual Impurities: | | | | | | |
| Free Chloride (ppm) | 0.20 | 0.15 | 0.10 | 0.80 | 1.00 | 0.80 |
| Methylene Chloride (ppm) | 20 | 15 | 1 | 30 | 83 | 25 |
| Water (%) | <0.1 | <0.1 | <0.1 | <0.1 | <0.1 | <0.1 |
| Number of Particles: | | | | | | |
| 0.5 to 1 μm (/g) | 5700 | 5670 | 5730 | 32470 | 38010 | 58320 |
| 1 to 10 μm (/g) | 279 | 287 | 251 | 5812 | 5421 | 8805 |
| 10 to 100 μm (/g) | 5 | 3 | 1 | 98 | 89 | 191 |
| Number of Flaws of Photo Disc | 38 | 20 | 10 | 507 | 631 | 988 |

In Comparative Example 1 (Run Nos. 6 to 8), the most of the flaws of the photo disc are ascribed to particle formation due to gelation and carbonization on drying and wear of the equipments.

Example 3 and comparative example 2

The same polycarbonate resin wet powder as obtained in Run No. 1 of Example 1 was pelletized in the same manner as in Example 1, except for changing th screw revolution and the resin output as shown in Table 3.

TABLE 3

| | Example 3 | | Compar. Example 2 | | |
|---|---|---|---|---|---|
| Run No. | 9 | 10 | 11 | 12 | 13 |
| Extrusion Condition: | | | | | |
| Screw Revolution (rpm) | 200 | 200 | 50 | 200 | 160 |
| Output (kg/hr) | 80 | 50 | 50 | 80 | 100 |

TABLE 3-continued

| Run No. | Example 3 9 | Example 3 10 | Compar. Example 2 11 | Compar. Example 2 12 | Compar. Example 2 13 |
|---|---|---|---|---|---|
| Rf | 191 | 306 | 77 | 96 | 122 |
| Residual Impurities: | | | | | |
| n-Heptane (ppm) | 35 | 20 | 350 | 195 | 70 |
| Free Chloride (ppm) | 0.20 | 0.10 | 0.55 | 0.45 | 0.30 |
| Methylene Chloride (ppm) | 14 | 1 | 90 | 66 | 26 |
| Water (%) | <0.1 | <0.1 | <0.1 | <0.1 | <0.1 |
| Number of Particles (/g): | | | | | |
| 0.5 to 1 μm | 5800 | 5680 | 5790 | 5900 | 5720 |
| 1 to 10 μm | 277 | 261 | 288 | 261 | 253 |
| 10 to 100 μm | 3 | 4 | 5 | 4 | 4 |
| Number of Flaws of Moded Photo Disc | 35 | 13 | 588 | 255 | 120 |

Example 4

To 200 l of the same purified polycarbonate resin solution as obtained in Example 1 was added 40 l of n-heptane, followed by stirring. The solution was added dropwise to n-heptane kept. at 25° C., followed by filtration to obtain a powder. The resulting powder was mixed with water of 25° C., and the mixture was heated to 95° C or higher to evaporate the organic solvent. The powder was taken out from the residue and filtered for dehydration to obtain a wet powder.

The wet powder, when dried, contained particles of 80 mesh or smaller in a proportion of 3.6% ,and particles of 10 mesh or greater in a proportion of 4.8%. The wet powder had a water content of 4.9%, an n-heptane content of 1000 ppm, and a methylene chloride content of 220 ppm.

The wet powder was pelletized and molded in the same manner as in Example 2 (Run Nos. 14 to 16). The results of evaluations are shown in Table 4.

COMPARATIVE EXAMPLE 3

The same polycarbonate resin wet powder as prepared in Example 4 was pelletized and molded in the same manner as in Comparative Example 1 (Run Nos. 17 to 19). The results of evaluations are shown in Table 4 below.

TABLE 4

| Run No. | Example 4 14 | Example 4 15 | Example 4 16 | Compar. Example 3 17 | Compar. Example 3 18 | Compar. Example 3 19 |
|---|---|---|---|---|---|---|
| Drying Conditions: | | | | | | |
| Temperature (°C.) | — | — | — | 140 | 140 | 140 |
| Time (hr) | — | — | — | 4 | 4 | 6 |
| Extrusion Condition: | | | | | | |
| Screw Revolution (rpm) | 200 | 200 | 200 | 200 | 50 | 200 |
| Output (kg/hr) | 100 | 80 | 50 | 100 | 50 | 100 |
| Rf | 153 | 191 | 306 | 153 | 77 | 153 |
| Residual Impurities: | | | | | | |
| n-Heptane (ppm) | 60 | 40 | 18 | 55 | 200 | 45 |
| Free Chloride (ppm) | 0.20 | 0.20 | 0.10 | 1.00 | 1.50 | 1.00 |
| Methylene Chloride (ppm) | 17 | 13 | 1 | 20 | 88 | 17 |
| Water (%) | <0.1 | <0.1 | <0.1 | <0.1 | <0.1 | <0.1 |
| Number of Particles: | | | | | | |
| 0.5 to 1 μm (/g) | 5080 | 5130 | 5070 | 42380 | 38950 | 69220 |
| 1 to 10 μm (/g) | 261 | 223 | 249 | 5902 | 4380 | 7960 |
| 10 to 100 μm (/g) | 4 | 4 | 2 | 118 | 99 | 102 |
| Number of Flaws of Photo Disc | 61 | 47 | 20 | 719 | 620 | 1031 |

EXAMPLE 5 AND COMPARATIVE EXAMPLE 4

The same polycarbonate resin wet powder as obtained in Example I was supplied to the same extruder as used in Example 1 taking care not to incorporate fine particles. A stabilizer and a parting agent as shown in Table 5 below were separately injected into the extruder through the inlet for introducing a liquid using the respective quantitative pump. Of these additives, powderous one was previously mixed with the wet powder and supplied to the extruder.

A photo disc was produced using each of the resulting molding materials (pellets) in the same manner as in Example 1, except for changing the extrusion conditions as indicated in Table 5.

The results of evaluations conducted in the same manner as in Example 1 are shown in Table 5. Further, the resulting photo disc was allowed to stand at 80° C and 90% RH for a prescribed period of time, and the number of flaws on the recording film was determined in the same manner as in Example 1. These results are also shown in Table 5.

TABLE 5

| Run No. | Example 5 20 | Example 5 21 | Example 5 22 | Example 5 23 | Compar. Example 4 24 | Compar. Example 4 25 | Compar. Example 4 26 | Compar. Example 4 27 |
|---|---|---|---|---|---|---|---|---|
| Extrusion Condition: | | | | | | | | |
| Screw Revolution | 200 | 200 | 200 | 200 | 50 | 50 | 50 | 50 |

TABLE 5-continued

| | Example 5 | | | | Compar. Example 4 | | | |
|---|---|---|---|---|---|---|---|---|
| Run No. | 20 | 21 | 22 | 23 | 24 | 25 | 26 | 27 |
| (rpm) | | | | | | | | |
| Output (kg/hr) | 100 | 100 | 50 | 50 | 50 | 50 | 50 | 50 |
| Rf | 153 | 153 | 306 | 306 | 77 | 77 | 77 | 77 |
| Stabilizer: | | | | | | | | |
| Kind*1 | PHA | PHA | PHA | TBTP | PHA | PHA | TBTP | TBTP |
| Amount (part × $10^3$) | 1 | 1 | 1 | 5 | 10 | 1 | 5 | 5 |
| Release Agent: | | | | | | | | |
| Kind*2 | — | BAE | BAMG | SAMG | — | BAE | BAMG | SAMG |
| Amount (part) | — | 0.2 | 0.02 | 0.04 | — | 0.2 | 0.02 | 0.04 |
| Residual Impurities: | | | | | | | | |
| n-Heptane (ppm) | 30 | 30 | 20 | 20 | 340 | 350 | 350 | 350 |
| Free Chloride (ppm) | 0.20 | 0.20 | 0.10 | 0.10 | 0.60 | 0.55 | 0.55 | 0.60 |
| Methylene Chloride (ppm) | 15 | 15 | 1 | 1 | 83 | 90 | 85 | 85 |
| Water (%) | <0.1 | <0.1 | <0.1 | <0.1 | <0.1 | <0.1 | <0.1 | <0.1 |
| Number of Particles: | | | | | | | | |
| 0.5 to 1 μm (/g) | 5600 | 5300 | 5250 | 5750 | 5790 | 5830 | 5780 | 5690 |
| 1 to 10 μm (/g) | 220 | 210 | 220 | 210 | 285 | 290 | 278 | 280 |
| 10 to 100 μm (/g) | 1 | 1 | 2 | 2 | 3 | 4 | 4 | 3 |
| Number of Flaws of Photo Disc: | | | | | | | | |
| Initial Stage | 30 | 25 | 15 | 25 | 270 | 315 | 305 | 320 |
| After 100 Hrs. | 40 | 35 | 60 | 65 | 310 | 340 | 355 | 325 |
| After 500 Hrs. | 60 | 65 | 85 | 85 | 450 | 470 | 485 | 455 |
| After 1000 Hrs. | 75 | 78 | 95 | 103 | 1580 | 1120 | 1360 | 1500 |

Note:
*1PHA . . . Phosphorous acid
TBTP ... Tris(2,4-di-t-butylphenyl)phosphite (powderous)
*2BAE ... Behenyl behenate
BAMG ... Behenic acid monoglyceride
SAMG ... Stearic acid monoglyceride As described above and demonstrated in Examples and Comparative Examples, the polycarbonate resin molding materials produced by the process of the present invention which excludes a drying step suffer from substantially no increase of particles, whereas the particles in the pellets prepared from dried powders shows a 5 to 10 times increase in number over those in the wet powder before drying. Moreover, the molding materials of the invention sufficiently satisfy the requirement that the residual halogenated hydrocarbon is not more than 20 ppm. Therefore, the molding materials according to the present invention provide optical materials having improved characteristics, for example, photo discs involving less flaws, and thus prove suitable for use as a molding material for producing optical materials.

In addition, since the process of the present invention does not include a drying step which generally requires a large-sized dryer for removing a residual solvent, the present invention provides a simplified and reasonable process having a significance in industrial practice.

Polycarbonate resins have received developments and improvements as the most promising material for optical materials in the light of the results so far reached in the field of compact discs. However, when they are used as a base on which a recording film is formed by vacuum evaporation or sputtering of aluminum, platinum, terbium, iron, cobalt, antimony, selenium, gadolinium, or an alloy of these metals, they have not always assured long-term reliability of the recording film. In this respect, too, the present invention has a great industrial significance, making a contribution to improve the long-term repliability of the recording film.

While the invention has been described in detail and with reference to specific embodiments thereof, it will be apparent to one skilled in the art that various changes and modifications can be made therein without departing from the spirit and scope thereof.

What is claimed is:

1. A process for producing a low-particle polycarbonate resin molding material, which comprises directly supplying a polycarbonate resin wet powder having a water content of from 0.5 to 10.0% by weight and an organic solvent content of from 0.01 to 5.0% by weight, said wet powder, when dried, having a weight average particle diameter of from 5 to 60 mesh, to a vented extruder and extruding the wet powder while venting to obtain pellets containing not more than 20 ppm of a residual halogenated hydrocarbon, said polycarbonate resin wet powder being obtained by separating an aromatic polycarbonate resin solution from a reaction mixture obtained by interfacial polymerization of a bisphenol and phosgene in the presence of a halogenated hydrocarbon as a solvent, purifying the resin solution so as to have a reduced particle content, and separating a polycarbonate resin wet powder from the purified polycarbonate solution.

2. A process as claimed in claim 1, wherein said vented extruder has a vent portion having a theoretical surface renewal frequency (Rf) of at least 150, the Rf being defined by equation (1):

$$Rf = A/V \quad (1)$$

wherein A represents a surface renewal of the vent ($cm^3$/sec); and V represents a resin hold-up ($cm^3$) at the vent portion.

3. A process as claimed in claim 1, wherein said wet powder contains an organic solvent comprising methylene chloride that is a good solvent for the polycarbonate resin and a poor solvent for the polycarbonate resin selected from the group consisting of n-heptane, n-hexane, cyclohexane, benzene, toluene, and xylene at a good solvent/poor solvent weight ratio of not more than 0.2.

4. A process as claimed in claim 1, wherein said wet powder is separated from said purified polycarbonate resin solution by adding a non-solvent or poor solvent for the polycarbonate resin to the purified polycarbonate resin solution in such an amount that does not cause precipitation, dropwise adding or spraying the resulting uniform solution into water kept at a temperature of from 40° to 140° C. under stirring to gelatinize, and removing the solvent by distillation to obtain a porous powder, followed by dehydration.

5. A process as claimed in claim 1, wherein said purified polycarbonate resin solution is obtained by subjecting the polycarbonate resin solution separated from the polymerization mixture by removing an alkali aqueous solution to neutralization treatment comprising at least three stages of washing with water, washing with a phosphoric acid aqueous solution, and washing with water, the phase separation after each of the washing stages being performed by a centrifugal force of 500 G or more, to finally obtain a resin solution having a water content of not more than 0.5% by weight, with the washings having an electrical conductivity of not more than 10 μs/cm, passing the resulting resin solution through a hydrophobic porous filter having a pore diameter of from 0.2 to 10 μm while removing water droplets condensed on the surface of the filter to obtain a resin solution having its water reduced to 0.2% by weight or less.

6. A process as claimed in claim 1, wherein the wet powder has a particle size range that the portion of particles having a particle size of 80 mesh or less does not exceed 5% by weight and the portion of particles having a particle size of 10 mesh or more does not exceed 5% by weight.

* * * * *